(12) United States Patent
Fahrenbach

(10) Patent No.: US 7,859,819 B2
(45) Date of Patent: Dec. 28, 2010

(54) COOLED ENERGY STORAGE DEVICE AND PRESS INCLUDING SUCH A DEVICE

(75) Inventor: Jürgen Fahrenbach, Aichelberg (DE)

(73) Assignee: Schuler Pressen GmbH + Co. KG, Göppingen (DE)

( * ) Notice: Subject to any disclaimer, the term of this patent is extended or adjusted under 35 U.S.C. 154(b) by 500 days.

(21) Appl. No.: 11/986,881

(22) Filed: Nov. 27, 2007

(65) Prior Publication Data

US 2008/0141875 A1    Jun. 19, 2008

(30) Foreign Application Priority Data

Dec. 13, 2006 (DE) ................... 10 2006 058 629

(51) Int. Cl.
*H01G 4/002* (2006.01)
*H01G 2/08* (2006.01)

(52) U.S. Cl. .................. 361/274.2; 361/274.3

(58) Field of Classification Search .... 361/274.1–274.3
See application file for complete search history.

(56) References Cited

U.S. PATENT DOCUMENTS

| 5,195,577 A | 3/1993 | Kameda et al. |
| 5,912,548 A * | 6/1999 | Downs et al. ................ 320/150 |
| 2006/0144069 A1* | 7/2006 | Hsu et al. ................... 62/259.2 |
| 2007/0080662 A1* | 4/2007 | Wu ............................ 320/110 |

FOREIGN PATENT DOCUMENTS

| EP | 0 117 349 A2 | 5/1984 |
| GB | 2 295 264 A | 5/1996 |
| JP | 2000077268 A * | 3/2000 |

* cited by examiner

*Primary Examiner*—Eric Thomas
(74) *Attorney, Agent, or Firm*—R. S. Lombard; K. Bach

(57) ABSTRACT

In an energy storage device (1) with evaporation cooling wherein the boiling temperature of a liquid which is disposed in heat exchange relationship with electric capacitors (2, 3, 4) for limiting the operating temperature of the electric capacitors, a thermal vapor condensing arrangement is provided for condensing the vapors formed from the liquid during cooling of the electric capacitors and returning the condensate back to the liquid surrounding the electric capacitors.

21 Claims, 4 Drawing Sheets

COOLED ENERGY STORAGE DEVICE AND PRESS INCLUDING SUCH A DEVICE

CROSS-REFERENCE TO RELATED APPLICATION

This application claims the priority benefits of German Application No. 10 2006 058 629.8 filed Dec. 13, 2006.

BACKGROUND OF THE INVENTION

Drives for press installation, presses or other manufacturing equipment often have energy requirements which are very variable. The drives which draw their energy via intermediate converters from an energy supply system. The different energy requirements of the various drives are superimposed establishing an overall energy requirement which varies with time. With the introduction of modern converter installations are increasingly capable to field energy taken out of the energy supply system at least partially back into the power supply system. For example, energy may be energy may be taken out of this energy supply system for accelerating a drive. However, when the drive is to be shut down again energy may be returned to the energy supply system. This increases the changes in the power requirements of machines and plants.

DE 198 211 59 A1, for example, discloses a deep draw press whose plunger is driven by servomotors via spindles. Also the drawing cushion is driven by servomotors via spindles. The various servomotors of the plunger are interconnected by elastic shafts. Also the servomotors of the drawing cushion are interconnected by electric shafts. Both groups of servomotors are controlled by a computer program.

The many different servomotors cause varying loads on the energy supply system. This is objectionable and disturbing when several machines operating in parallel are operating at peak loads at the same time and an incidental or systematic synchronization of the energy withdrawal phases occur at the same time for the various drives and possibly the energy is also returned from the various drives to the energy supply system at the same time.

This problem may occur, for example, in connection with the press disclosed in DE 10 2005 026 818 A1 wherein various electric drives for the main movement of the plunger and the additional movement of the workpiece transport elements are interconnected via energy storage devices and/or energy exchange modules.

If energy storage devices are provided, the energy storage devices are constantly charged and discharged particularly in connection with the periodic operation of the presses. The capacitors are, therefore, arranged in heat exchange with liquid-conducting spaces or conduits wherein the liquid takes up heat at one point and releases it again at another. In addition, a cooling system is provided on the basis of so-called heat pipes.

Rail vehicles require for each starting process a relatively large amount of energy while essentially the same large amount of energy becomes available during the braking procedure and is to be stored in the capacitor modules. However, starting and braking procedures occur with substantial time delay so that a good amount of time is available for conducting the waste heat away. The cooling medium, for example, de-ionized water has a high heat capacity and therefore can take up relatively large amounts of heat and store it for some time.

In press installations however, energy use and energy release change within seconds, in large component stage presses, for example, in a four or five seconds rhythm. With the same rhythms, the capacitors must be able to take up and release the energy so that they generate waste heat practically constantly. Therefore, a powerful cooling system is required, and it is the object of the present invention to provide such a highly effective cooling system.

SUMMARY OF THE INVENTION

In an energy storage device (1) with evaporation cooling wherein the boiling temperature of a liquid which is disposed in heat exchange relationship with electric capacitors (2, 3, 4) for limiting the operating temperature of the electric capacitors, a thermal vapor condensing arrangement is provided for condensing the vapors formed from the liquid during cooling of the electric capacitors and returning the condensate back to the liquid surrounding the electric capacitors.

With this arrangement the temperature of the body of liquid can not exceed a limit temperature that is its boiling temperature. It therefore, forms a heat sink with constant temperature for the waste heat generated in the capacitors. In this way, the capacitors are prevented from overheating.

The interior space of the outer housing may be filled partially with the body of liquid and partially with steam. The capacitors are arranged preferably in the lower part of the housing where they are fully or partially immersed in the body of liquid. The interior space above the capacitors is filled with steam, which may for example condense on the wall of the auto housing while releasing heat, and flow back along the walls of the housing to the body of water surrounding the capacitors. The simple principle is suitable particularly for stationary applications such as presses and press installations, where the portion of the outer housing and of the capacitors remains unchanged and where no acceleration forces, centrifugal forces, etc., are effective on the energy storage device.

Preferably, the electric lines which connect the capacitors to one another and also to outside connections, are arranged within the body of liquid. The lines which preferably consist of copper, therefore can contribute to the cooling of the body of liquid and, as a result, to the removal of heat.

Between the capacitors, there are preferably evaporation spaces which extend vertically. As a result, the gas and vapor bubbles forming in the evaporation spaces are free to move to the top of the liquid body. The liquid level is preferably slightly above or below the tops of the capacitors. This has the advantage that the capacitors are cooled over their full height and the body of liquid being evaporated provides for a uniform temperature over the whole surface of the respective capacitors.

While in this simple solution it is preferred that the body of liquid is in direct contact with the capacitor housings, so that they are all wetted by the liquid, the evaporation chambers and the capacitors may be brought into a heat exchange relationship by way of another liquid. The additional heat exchange liquid may, for example, be oil or another heat carrying fluid. This has the advantage that as evaporating liquid or liquid can be selected which is not suitable for a direct contact with the capacitor surfaces, for example, because of its solvent properties, because of its penetration capabilities or because of other disadvantageous properties. This liquid may be contained in special evaporation systems whose internal pressure deviates substantially from the pressure within the outer housing of the capacitors. Such a fluid may be, for example, a highly pressurized carbon dioxide. The effect of the pressure is contained so that the capacitors are not exposed to the high pressure. Also, organic solvents, hydrocarbons, fluor-chlor-hydrocarbons, carbon disulfide or other easily vaporizable liquids may be used for the evaporation cooling.

The energy storage device disclosed herein is suitable, in all embodiments for use in connection with presses or press installations for an interim storage of energy amounts generated within a short period.

With the effective cooling to a constant temperature, a reduction of the operating life of the capacitors is avoided. As capacitors super-capacitors with high capacity values can be used.

The invention will become more readily apparent from the following description of advantageous embodiments thereof on the basis of the accompanying drawings.

DESCRIPTION OF THE PREFERRED EMBODIMENTS

Figure 1:
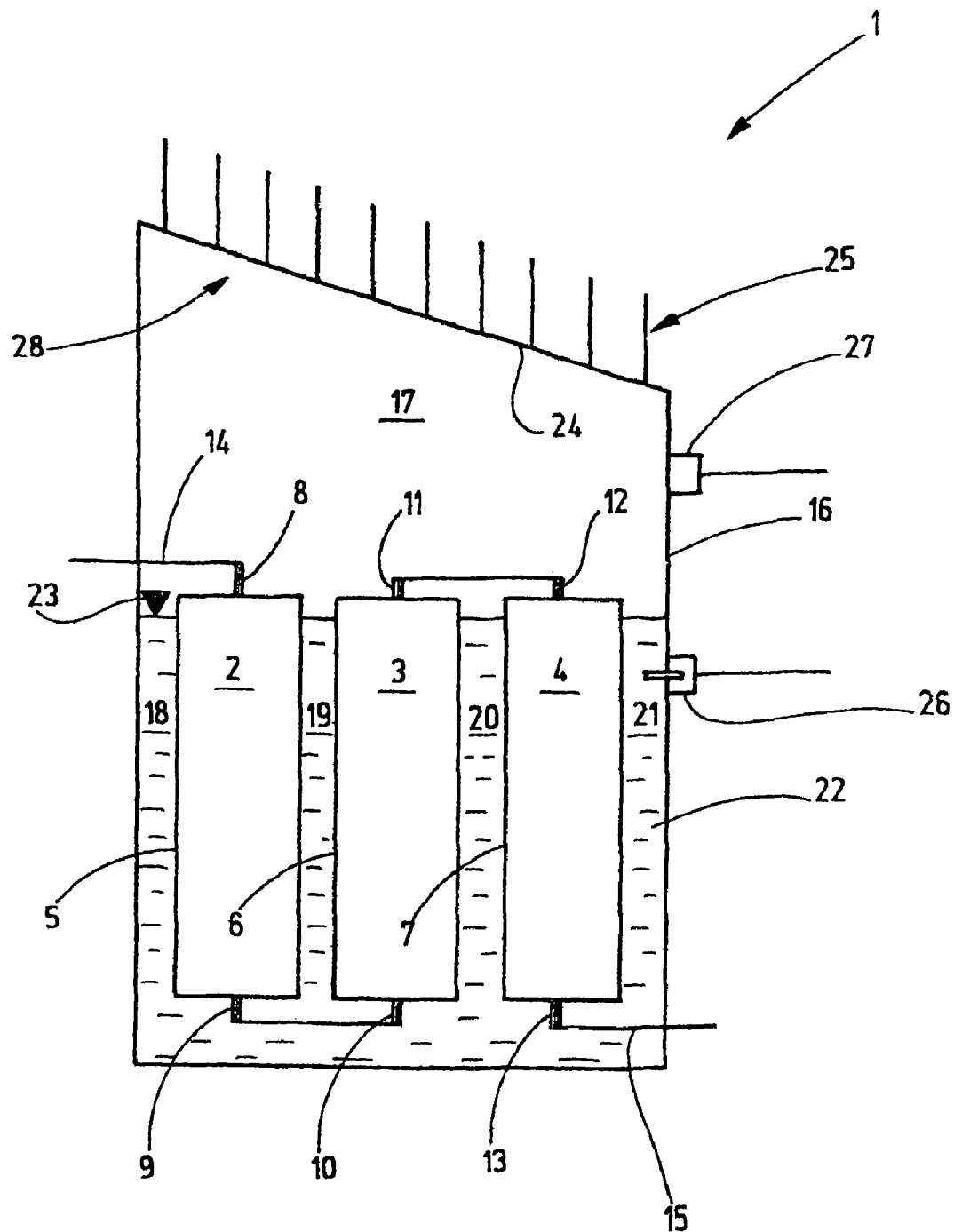
FIG. 1 shows schematically a simple embodiment of an energy storage device according to the invention.

FIG. 1 shows an energy storage device 1 as it may be used, for example, as an energy buffer for a press installation including, for example, a drawing press according to DE 198 21 159 A1 or another conventional press with a motor-driven plunger and a hydraulic drawing cushion and additional presses. The energy storage device 1, however, is particularly suitable for presses and other machine tools with one or several servo drives which are periodically accelerated and decelerated, particularly if those drives are associated with relatively large dynamic loads.

The energy storage device 1 includes one or several electric capacitors 2, 3, 4 which are preferably electric double layer capacitors, so-called Super Caps or also Ultra Caps. They have each a capacity of several hundred to several thousand farads. The individual capacitors or capacitors 2, 3, 4 have generally, a relatively low maximum voltage of, for example, 2.5 volt. For increasing the available voltage, several such capacitors 2, 3, 4 are arranged electrically in a series circuit. Each capacitor 2, 3, 4, however, may consist of several capacitors arranged in a series circuit and therefore can be considered to be a capacitor module.

Each capacitor 2, 3, 4 comprises a capacitor housing 5, 6, 7 from which electrical connectors 8, 9, 10, 11, 12, 13 extend. The connectors 8 to 13 are interconnected, so as to provide an electric series circuit with ends forming energy storage device connectors 14, 15.

The capacitors 2, 3, 4 are accommodated in a housing 16 which preferably sealingly surrounds an interior space 17. Preferably the sealed arrangement is maintained even when a pressure difference develops between the interior space 17 and the ambient. Rupture valves may be provided in order to prevent the development of an excessive pressure in the interior space 17.

The capacitors 2, 3, 4 are preferably arranged in a lower part of the interior space so as to extend vertically with evaporation chambers 18-21 formed at opposite sides.

The energy storage device connectors 14, 15 extend through the housing 16. Alternatively at least one of the energy storage device connectors 14 or 15 can be connected to the housing 16 which then serves as an electrical connector. However, at least one of the two energy storage device connectors 14, 15 must penetrate the housing 16 in an insulated way.

Between and around the capacitors 2, 3, 4 evaporation spaces are provided which are filled by a liquid body 22. The body of liquid consists of a free inert liquid, for example, a fluor-chlor-hydrocarbons or another liquid which causes no damage to the capacitors and has a low boiling point. For reducing the boiling point, the pressure in the inner space 17 of the housing 16 may be maintained at a value substantially below the ambient pressure.

The body of liquid 22 has a top level 23 corresponding about top surfaces of the capacitors 2, 3, 4 and an open vapor space is provided above the top level 23. The top of the housing 16 forms a heat conductive housing wall 24, which, for improving heat transfer, may be provided with cooling ribs 25 or other means which improve the use of the heat transfer surface. It forms a vapor condensing structure 28.

For supporting and maintaining the operation, the outer housing 16 may be provided with temperature sensor 26 which is preferably positioned below the liquid level 23 in order to detect the temperature of the body of liquid 22. In addition, a pressure sensor 27 may be provided on the housing 16 for determining the pressure in the inner space 17. The temperature sensor 26 and the pressure sensor 27 supply electrical signals to a monitoring unit for the surveillance of the operation of the energy storage device 1.

The energy storage device 1 operates as follows:

During operation when the capacitors 2, 3, 4 are charged and discharged in rapid succession, a heat flow is generated from the capacitors to the body of liquid 22 surrounding the capacitors. The liquid is heated to its boiling point, for example, 30° C. or 40° C. and then starts to boil. The boiling temperature is determined by the selection of the liquid and the pressure in the inner space 17 in such a way that it is safely below the maximum temperature of the capacitors 2, 3, 4.

When the body of liquid begins to boil vapor bubbles are formed and raise between the capacitors 2, 3, 4. The vapor has the temperature of the boiling liquid and rises to the top wall 24 which has an ambient temperature of, for example, 25° C. The vapor condenses on the top wall 24 and flows back along the inner wall of the housing 16 down to replenish the body of liquid 22. the top wall 24 forms therefore a thermal condensation arrangement 28 for the vapor raising from the body of liquid 22.

In this way the capacitors 2, 3, 4 are effectively cooled so that they can be charged and discharged in rapid succession utilizing their full capacity.

Figure 2:
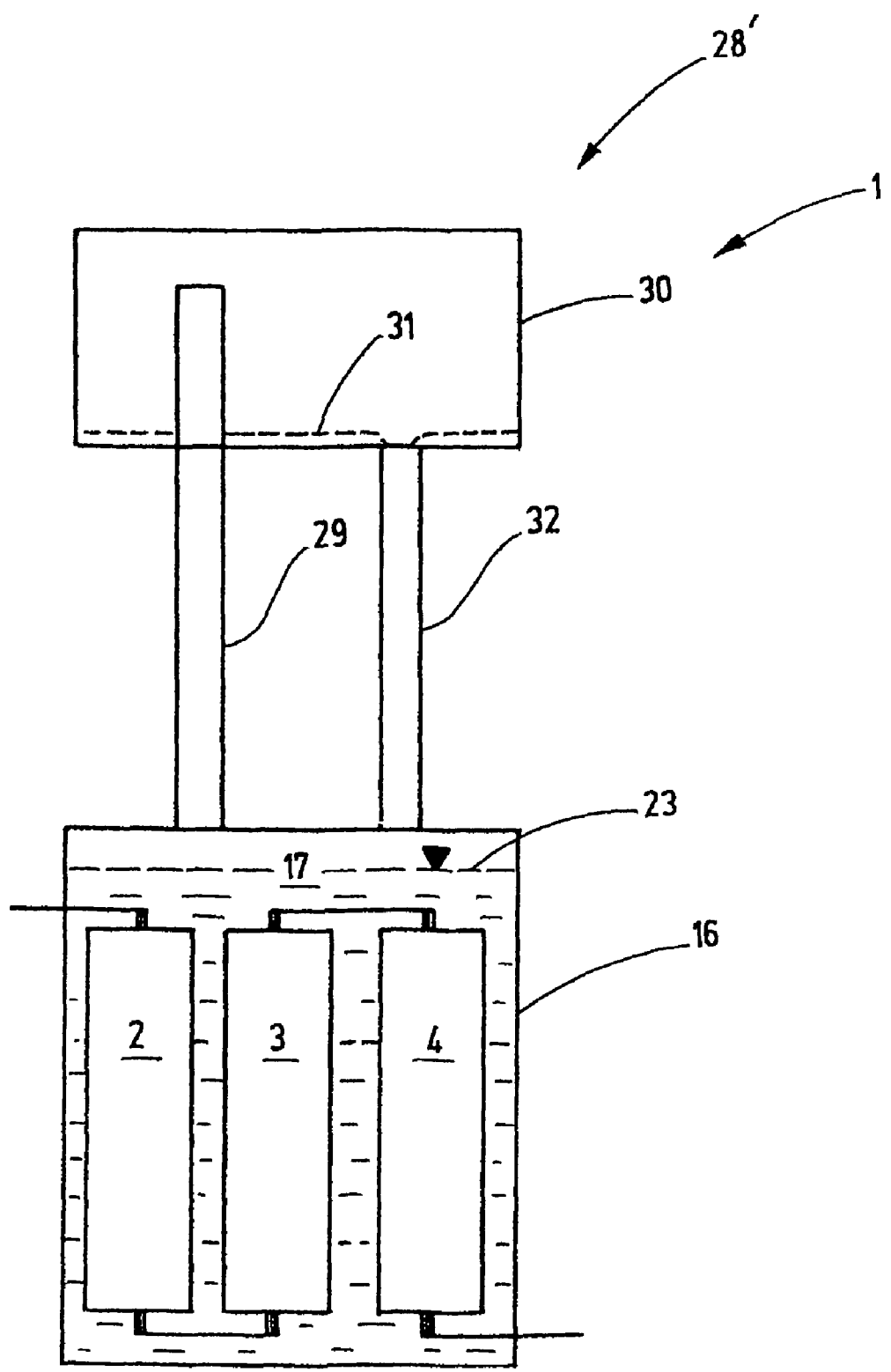
FIG. 2 shows schematically a modified embodiment of the energy storage device of FIG. 1.

FIG. 2 shows another embodiment of the energy storage device according to the invention. Whereas in the energy storage device 1 according to FIG. 1, evaporation and condensation of the liquid occurs in the same inner space 17 and the condensation arrangement 28 is part of the housing 16, in the embodiment according to FIG. 2 the condensation arrangement 28' is formed separate from the housing 16. For the embodiment according to FIG. 2, the above description also applies except for the particulars as described below:

The housing 16 includes above the liquid level 23 a vapor space, a conduit 29 extending from the top of the housing 16 conducts the vapor to another chamber 30 which forms a capacitor for the condensation of the vapor, so as to provide the capacitor structure 28'. FIG. 2 schematically shows a chamber 30 which is closed all around and comprises a thermally conductive wall via which the condensation heat of the vapor is transferred to the ambient. As a result, a body of liquid consisting of condensate 31 is collected on the bottom wall. The condensate flows back to the housing 16 via conduit 32 extending from the bottom of the chamber 30. The conduits 29, 32 extend, for example, vertically and open into the chamber 30 at different levels.

The chamber 30 is preferably arranged above the housing 16. If, for design or other reasons, the chamber 30 needs to be arranged at the same level as, or below, the housing 16 a pumping arrangement and possibly a check valve must be arranged in the conduit 32. The pumping arrangement is adapted to pump condensate generated in the chamber 30 back into the housing 16 surrounding the capacitors 2, 3, 4.

The advantage of this embodiment is that the heat discarding location can be arranged relatively remote from the capacitors 2, 3, 4.

Figure 3:
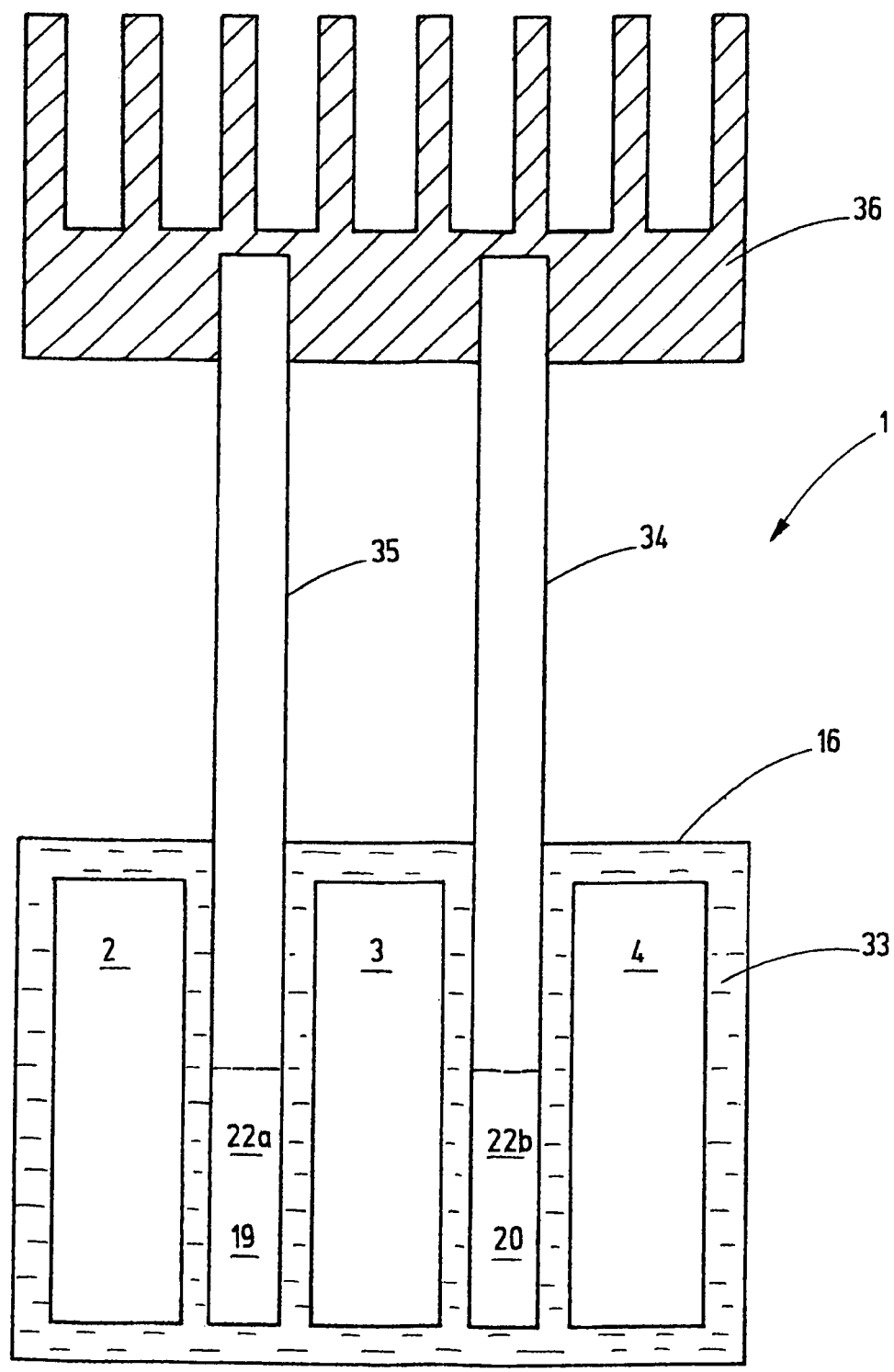
FIG. 3 shows schematically another embodiment of the energy device according to the invention.

FIG. 3 shows another embodiment of the energy storage device 1. The description of FIG. 1 also applies for this case. Additionally, the following description is provided:

The housing 16 is filled with a liquid 33 whose evaporation temperature is above the operating temperature of the capacitors 2, 3, 4 and which is not vaporized during operation of the energy storage device, but remains liquid. It preferably fully fills the interior of the housing 16. A small gas space may remain as pressure compensation buffer. Alternatively or additionally, a pressure compensation container may be connected via which the liquid 33 is in communication with the ambient pressure. The electrical connections of the capacitors 2, 3, 4 are not shown. They may extend through the housing wall 16 as described earlier. The liquid 33 is preferably an electrically insulating liquid such as transformer oil.

Between the capacitors 2, 3, 4 there are intermediate spaces into which closed pressure tubes 34, 35 extend. They have internal spaces whose bottom ends form evaporation chambers 19, 20. These preferably cylindrical tubes consist preferably of a metal with good heat conductivity and are closed at their bottom and top ends. They contain a body of liquid 22a, 22b of a liquid with a low boiling temperature, for example, pressured $CO_2$ or another liquid suitable as heat carrier. Preferably, the boiling point is adjusted to a relatively low temperature which is only slightly above the ambient temperature by adjustment of the pressure in the hermetically closed tubes 34, 35. The tubes 34, 35 extend upwardly through the housing 16, for example, through the top wall thereof vertically or in an inclined orientation. At their upper ends they carry a heat exchange structure 36 consisting, for example, of aluminum or copper with which they are in close heat transfer relationship. The pressures in the tubes 34, 35 may be the same or they may differ. The tubes 34, 35 may be in contact with the capacitors 2, 3, 4 in order to improve the heat transfer from the capacitors 2, 3, 4 to the tubes 34, 35.

In this embodiment of the invention, the heat generated by the capacitors 2, 3, 4 is first transferred to the liquid 33 which transfers the heat then convectively to the tubes 34, 35. The tubes 34, 35 transfer the heat to the bodies of liquid 22a, 22b within the tubes whereby the liquid within the tubes begins to boil. The vapors raise and reach the top ends of the tubes 34, 35 which are kept by the heat exchange structure 36 at a relatively low temperature of, for example, 30° C. The vapors are condensed at the upper ends of the tubes 34, 35 and the condensate flows back under the force of gravity to replenish the body of liquid in the lower ends of the tubes which keeps boiling at a temperature only slightly above that of the returning condensate.

The advantage of this embodiment resides in the fact that, on one hand, the heat transfer by way of the tubes 34, 35 and the liquid boiling therein can be optimized with regard to the selection of the liquid and the operating pressure and, on the other hand, the capacitors 2, 3, 4 can be arranged in an inert, electrically insulating environment which, if desired, is maintained at ambient pressure.

Figure 4:
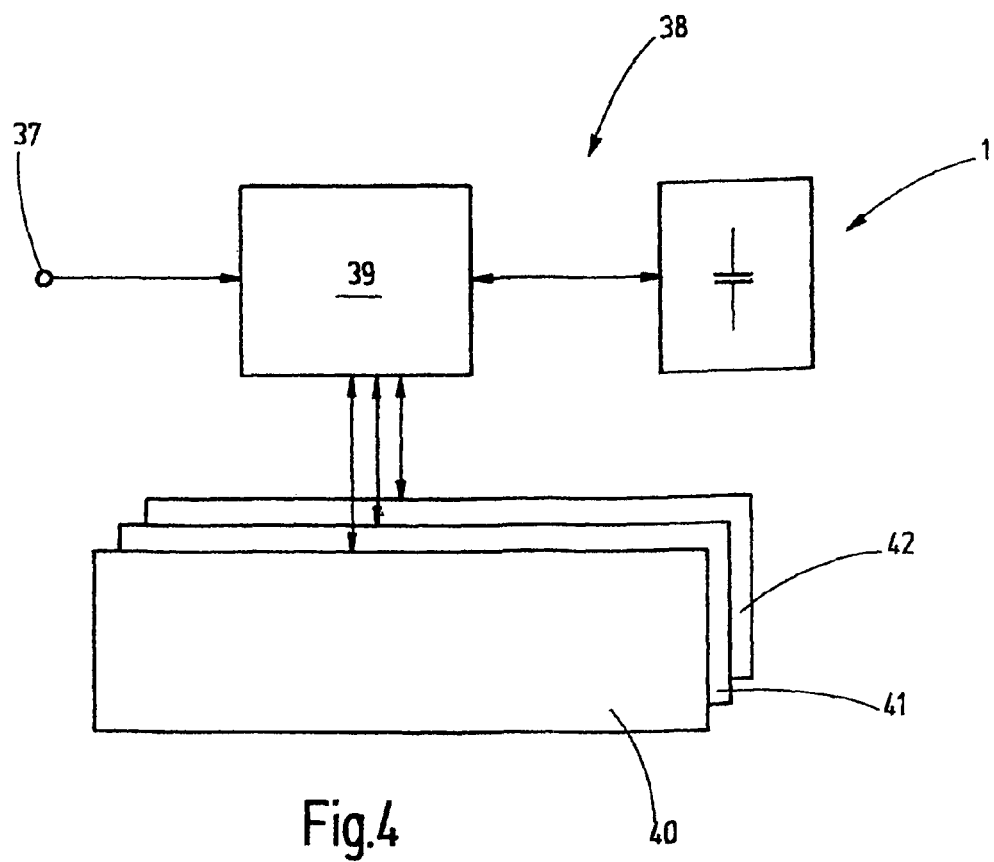
FIG. 4 shows an energy management system for a press installation with an energy storage device according to any of FIGS. 1-3; and, FIG. 5 shows a modified embodiment of the energy management system of FIG. 4 in a schematic sectional representation.

FIG. 4 shows an energy management system of a manufacturing installation, such as, for example, a press installation. The installation 38 receives electric energy from a power supply system 37. A corresponding converter unit 39 includes a control arrangement as well as DC and AC converters. The converter arrangement generates from the power supply voltage an intermediate circuit DC voltage which feeds individual drives 40, 41, 42 via different converters. The converter unit 39 connects the DC voltage intermediate circuit, additionally to one or several energy storage devices 1 according to one of the embodiments described above. The energy storage device 1 is employed, utilizing its maximum capacity, to store feedback energy from the drives 40, 41, 42 whenever that energy can not be used by other drives, so as to award the need to feed that energy back into the energy supply system. During low load operations when none of the drives 40, 41, 42 need a substantial amount of energy, but certain energy needs are to be soon expected in accordance with the normal operation, the energy storage device 1 may take energy out of the energy supply system 37 in advance in order to later support the energy supply system in feeding the drives 40, 41, 42. In this way, in an extreme case, the load on the energy supply system may be fully uniform, so that in spite of the time-dependent strongly varying energy needs of the drives 40, 41, 42 and possibly in spite of the presence of energy feedbacks from these drives, a relatively uniform, that is, time-wise constant load of the power supply system is obtained.

Figure 5:
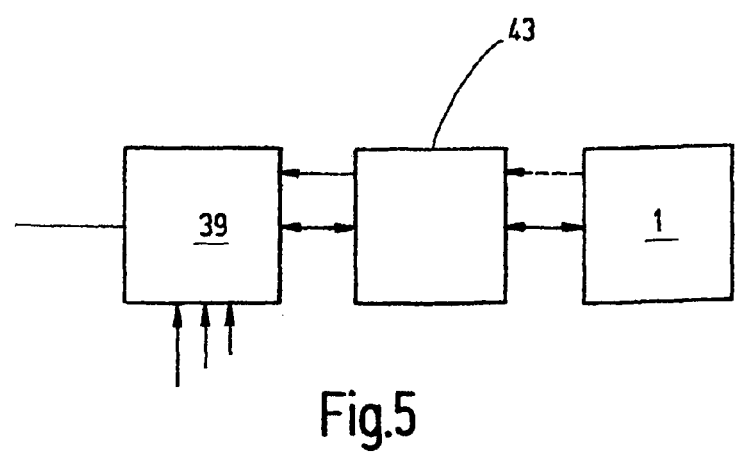

FIG. 5 discloses schematically the intermediate arrangement of a surveillance group 43 disposed between the energy storage device 1 and the converter installation 39 which, as described above, represents an energy management arrangement. The surveillance group 43 may be a safety installation group which maintains the current flow into and out of the energy storage device 1. In addition, the surveillance group 43 may be connected to the temperature sensor 26 and/or the pressure sensor 27 in order to monitor the state of the energy storage device 1 and to prevent dangerous situations. If an unacceptable pressure and/or current increase is detected, the surveillance group 43 can introduce measures, such as causing the converter installation 39 to reduce the currents to, and from, the energy storage device 1 or to shut it down. In this case, the converter installation 39 can operate the drives 40, 41, 42 with a reduced speed or it can increase the load of the power supply system by reducing, in this case, the uniformity of the power supply system load.

The energy storage device 1 according to the invention, operates with evaporation cooling, wherein the boiling temperature of a liquid disposed in heat exchange relation with the capacitors 2, 3, 4 for limiting the operating temperature of the capacitors 2, 3, 4. The energy storage device comprises a thermal condensation arrangement for the condensation of the vapors formed from the cooling liquid and returns it to the body of liquid 22. Preferably this circuit operates on the basis of gravity. However, for increasing the degree of freedom of design, a pump may be provided for the return of the condensate to the body of cooling liquid.

What is claimed is:

1. An energy storage device (1) comprising several electric capacitors (2, 3, 4) enclosed in a capacitor housing (5, 6, 7) each provided with at least one electrical connector (8-13),
   an outer housing (16) enclosing an interior space (17) accommodating the several electric capacitors (2, 3, 4) each arranged in the outer housing (16),
   a body of a liquid (22) disposed in the outer housing (16) in heat exchange relationship with the capacitor housings (5, 6, 7), said body of liquid housing a boiling temperature below a predetermined maximum operating temperature of the electric capacitors (2, 3, 4) so that the liquid boils when the electric capacitors (2, 3, 4) are in operation, thereby forming vapors,
   a vapor condensation structure (28) for condensing the vapors to form condensate which is returned to the liquid body (22) surrounding the electric capacitors (2, 3, 4),
   vertically oriented evaporation chambers (18, 19, 20, 21) are disposed at opposite sides of the electric capacitors (2, 3, 4).

2. An energy storage device according to claim 1, wherein the interior space (17) of the outer housing (16) is occupied at least partially by the liquid body (22) and by vapor.

3. An energy storage device according to claim 1, wherein during operation the liquid body (22) comprises vapor bubbles.

4. An energy storage device according to claim 1, wherein the vertically oriented evaporation chambers (18, 19, 20, 21) at opposite sides of the electric capacitors (2, 3, 4) are in fluid flow communication with one another within the outer housing (16).

5. An energy storage device according to claim 1, wherein the vertically oriented evaporation chambers (18, 19, 20, 21) at opposite sides of the electric capacitors are separated from one another.

6. An energy storage device according to claim 5, wherein the evaporation chambers (18, 19, 20, 21) have the same internal pressure.

7. An energy storage device according to claim 5, wherein the evaporation chambers (18, 19, 20, 21) are maintained at different pressures.

8. An energy storage device according to claim 1, wherein the capacitor housing (5, 6, 7) of each electric capacitor (2, 3, 4) is in direct contact with the body of liquid (22).

9. An energy storage device according to claim 1, wherein the capacitor housing (5, 6, 7) of each electric capacitor (2, 3, 4) is thermally connected to the evaporation chambers (18, 19, 20, 21).

10. An energy storage device according to claim 1, wherein the electric capacitor (2) has two electric connectors (8, 9) of which at least one is emerged in the body of liquid (22).

11. An energy storage device according to claim 1, wherein the electric capacitor (2) has two electric connectors (8, 9) of which at least one is surrounded by vapor.

12. An energy storage device according to claim 1, wherein the energy storage device (1) includes at least one connector (15) which extends through the outer housing (16) below the liquid level (23) of the body of liquid (22).

13. An energy storage device according to claim 1, wherein the energy storage device (1) includes at least one connector (14) which extends through the outer housing above the liquid level (23) of the body of liquid (22).

14. An energy storage device according to claim 1, wherein the vapor condensing structure (28) is formed by a wall (24) of the outer housing (16).

15. An energy storage device according to claim 1, wherein the vapor condensing structure (28') is formed separate from the outer housing (16).

16. An energy storage device according to claim 15, wherein vapor condensing structure (28') is in fluid communication with the interior space (17) of the outer housing (16) via at least one conduit (29, 32).

17. An energy storage device according to claim 16, wherein the vapor condensation structure (28') is in fluid communication with the outer housing (16) by way of at least one vapor conduit (29) and at least one condensate return conduit (32).

18. An energy storage device according to claim 1, wherein at least one heat pipe (34, 35) extends from the outer housing (16) and is connected, in heat transfer relationship to a heat exchange structure (36) for dissipating heat.

19. A press or press installation including an energy storage device (1) comprising several electric capacitors (2, 3, 4) each enclosed in a capacitor housing (5, 6, 7) each provided with at least one electrical connector (8-13),
   an outer housing (16) enclosing an interior space (17) accommodating the several electric capacitors (2, 3, 4) each arranged in the outer housing (16),
   a body of liquid (22) disposed in the outer housing (16) in heat exchange relationship with the capacitor housings (5, 6, 7), said body of liquid housing a boiling temperature below a predetermined maximum operating temperature of the electric capacitors (2, 3, 4) so that the liquid boils when the electric capacitors (2, 3, 4) are in operation, thereby forming vapors,
   a vapor condensation structure (28) for condensing the vapors to form condensate which is returned to the liquid body (22) surrounding the electric capacitors (2, 3, 4),
   vertically oriented evaporation chambers (18, 19, 20, 21) are disposed at opposite sides of the electric capacitors (2, 3, 4).

20. A press or press installation according to claim 19, including an energy management installation (38) for monitoring the charging and discharging of the energy storage device.

21. A press or press installation according to claim 20, wherein the energy management installation (38) reduces the charging and discharging currents when the temperature of the energy storage device (1) exceeds a limit temperature.

* * * * *